United States Patent
Miura (10) Patent No.: US 9,416,882 B2
(45) Date of Patent: Aug. 16, 2016

(54) SPLIT VALVE

(71) Applicant: MIURA CO., LTD, Saitama (JP)

(72) Inventor: Takao Miura, Saitama (JP)

(73) Assignee: MIURA CO., LTD, Saitama (JP)

( * ) Notice: Subject to any disclaimer, the term of this patent is extended or adjusted under 35 U.S.C. 154(b) by 112 days.

(21) Appl. No.: 14/463,916

(22) Filed: Aug. 20, 2014

(65) Prior Publication Data

US 2015/0053881 A1 Feb. 26, 2015

(30) Foreign Application Priority Data

Aug. 21, 2013 (JP) .................................. 2013-171419

(51) Int. Cl.
*F16K 5/06* (2006.01)
*F16K 27/08* (2006.01)
*B65G 69/18* (2006.01)
*F16K 1/20* (2006.01)
*F16K 5/20* (2006.01)

(52) U.S. Cl.
CPC ............ *F16K 5/0605* (2013.01); *B65G 69/183* (2013.01); *F16K 1/20* (2013.01); *F16K 1/2042* (2013.01); *F16K 5/204* (2013.01); *F16K 27/08* (2013.01)

(58) Field of Classification Search
CPC ........... B65G 69/183; F16K 1/00; F16K 1/20; F16K 1/2042; F16K 27/08; F16K 5/0605; F16K 5/204
USPC .......................................... 141/351; 251/309
See application file for complete search history.

(56) References Cited

U.S. PATENT DOCUMENTS

| | | | | |
|---|---|---|---|---|
| 213,531 | A * | 3/1879 | Scherer | F16K 1/20 137/315.13 |
| 4,427,025 | A * | 1/1984 | Prince | F16K 15/033 137/527 |
| 5,095,946 | A * | 3/1992 | McLennan | F16L 29/00 137/614.01 |
| 5,284,182 | A * | 2/1994 | McLennan | F16K 1/2263 137/242 |
| 5,641,011 | A * | 6/1997 | Benedetti, Jr. | B65B 1/06 137/614.02 |
| 6,050,309 | A * | 4/2000 | Woodruff | A01M 7/0092 141/346 |
| 6,412,518 | B1 * | 7/2002 | Pieri | B65D 90/587 137/614.01 |

(Continued)

FOREIGN PATENT DOCUMENTS

| DE | 102007050077 A1 | 4/2009 |
|---|---|---|
| EP | 0379233 A1 | 7/1990 |

(Continued)

OTHER PUBLICATIONS

European Search Report dated Feb. 16, 2015.

*Primary Examiner* — Mark A Laurenzi
*Assistant Examiner* — Andrew Schmid
(74) *Attorney, Agent, or Firm* — Rabin & Berdo, P.C.

(57) ABSTRACT

A split valve includes: an upper valve body having a spherical surface abutting on a seat surface of a discharge port to block the discharge port and a hollow on a lower surface; a lower valve body that blocks a receiving port by causing a spherical surface to abut on a seat surface of a receiving port and has a protrusion fitted to the hollow of the upper valve body on its upper surface, a shaft that rotates the lower valve body, an air supply/discharge mechanism that supplies/discharges an air pressure into/from a chamber defined by the protrusion and the hollow.

3 Claims, 8 Drawing Sheets

(56) References Cited

U.S. PATENT DOCUMENTS

| | | | |
|---|---|---|---|
| 7,874,466 B2 * | 1/2011 | McConville | B65D 47/2031 220/203.18 |
| 2004/0094211 A1 * | 5/2004 | Koch | B65G 69/183 137/614.06 |
| 2004/0099335 A1 * | 5/2004 | Koch | B65G 45/10 141/383 |
| 2010/0288374 A1 * | 11/2010 | Pollack | F16K 1/22 137/315.18 |
| 2012/0074341 A1 * | 3/2012 | Untch | B65G 69/183 251/314 |
| 2012/0111443 A1 * | 5/2012 | Untch | B65G 69/183 141/1 |
| 2012/0112108 A1 * | 5/2012 | Barton | F16K 1/223 251/212 |
| 2012/0138834 A1 * | 6/2012 | Tortel | F16K 1/24 251/304 |
| 2015/0027563 A1 * | 1/2015 | Barton | F16K 5/0407 137/385 |
| 2015/0053881 A1 * | 2/2015 | Miura | F16K 5/0605 251/309 |

FOREIGN PATENT DOCUMENTS

| | | | |
|---|---|---|---|
| EP | 1043252 A1 | 10/2000 | |
| JP | H08-2510 A | 1/1996 | |
| JP | 2003-267480 A | 9/2003 | |
| JP | 2008-025798 A | 2/2008 | |
| WO | WO 2009050173 A1 * | 4/2009 | F16K 1/22 |
| WO | WO 2010092395 A1 * | 8/2010 | F16K 1/223 |

* cited by examiner

FIG. 5B ably equal between the discharge port 4 and the receiving port 5.

SPLIT VALVE

TECHNICAL FIELD

The present invention relates to a split valve.

BACKGROUND ART

In the fields of pharmaceutical industries or food industries, there is known a split valve divided into two parts in order to prevent scattering of a granular material and intrusion of an external foreign object when a granular material contained in a container such as a reservoir is transferred to another receiving container.

In JP1996-2510A, there is discussed a split valve having one valve provided in an opening of a container that contains a granular material and the other valve provided in an opening of the receiving container. In order to transfer a granular material of the container into the receiving container, the split valve is integrated by coupling both openings and pressing end faces of the divided valve bodies of the split valve to each other. Then, the integrated split valve is rotated using a rotation mechanism to cause both the openings to communicate with each other, and a granular material in the container freely falls down to the inside of the receiving container.

SUMMARY OF INVENTION

In the technique of the related art described above, since the divided split valve is simply integrated by the pressing force, both the end faces of the valve bodies are not perfectly hermetically engaged with each other.

Therefore, when the integrated split valve is opened, a granular material may intrude into a gap between both the end faces of the valve bodies.

If a granular material intrudes into the gap between the end faces of the valve bodies, the granular material intruding into the gap between the valve bodies may be scattered to the outside when the transfer of the granular material to the receiving container is completed, the integrated split valve is closed, the container and the receiving container are separated from each other, and the split valve is then removed.

It is an object of the present invention to provide a split valve capable of preventing a granular material from being scattered.

According to one aspect of the present invention, a split valve that causes a discharge port provided in a lower side of a container and a receiving port provided in an upper side of a receiving container to communicate with each other in order to transfer a granular material contained in the container to the receiving container is provided. A split valve includes an upper valve body that constitutes an upper portion of a upwardly protruding hemisphere and has a spherical surface abutting on a spherical seat surface of the discharge port to block the discharge port and has a hollow on a lower surface, a lower valve body that constitutes a lower portion of the hemisphere and has a spherical surface abutting on a spherical seat surface of the receiving port to block the receiving port and has a protrusion fitted to the hollow of the upper valve body on an upper surface, a shaft that is connected to the lower valve body and can rotate the lower valve body, and an air supply/discharge mechanism that is configured to supply/discharge an air pressure to/from a chamber defined by the protrusion and the hollow. The lower valve body and the upper valve body are hermetically engaged with each other by causing the upper surface of the lower valve body and the lower surface of the upper valve body to abut on each other and vacuumizing the chamber, and the discharge port and the receiving port then communicate with each other by rotating the shaft.

DESCRIPTION OF EMBODIMENTS

Embodiments of the present invention will now be described with reference to the accompanying drawings.

Figure 1:
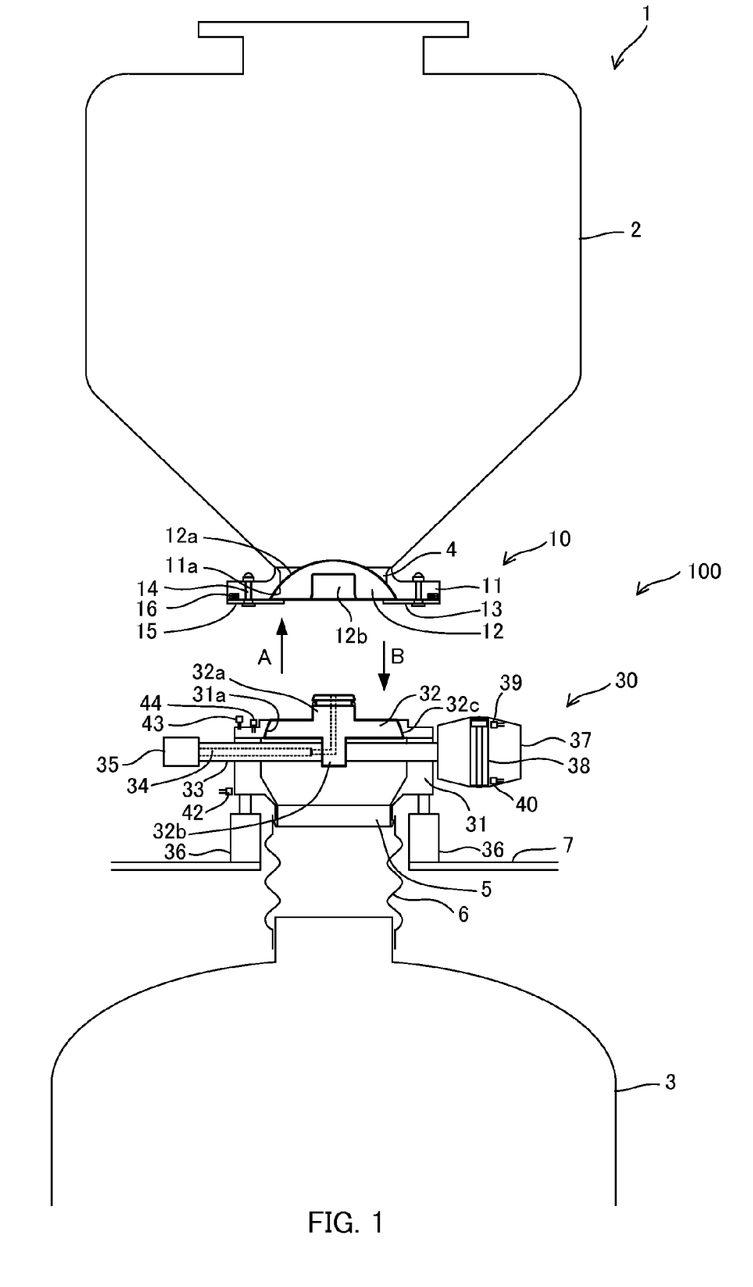
FIG. 1 is a partially cross-sectional view illustrating the entire apparatus including a split valve according to an embodiment of the present invention.

FIG. 1 is a partially cross-sectional view illustrating the entire apparatus having a split valve 100 according to an present embodiment.

The apparatus 1 of FIG. 1 is an apparatus that transfers a granular material contained in a container 2 into a receiving container 3 disposed under the container 2. For example, the apparatus 1 may be an apparatus for transferring granules contained in the container 2 into a millstone of a tableting machine to make tablets. It is noted that the granular material refers to an aggregation of materials such as powders, granules, and the like.

The container 2 has a funnel-like shape and has a tubular discharge port 4 for discharging the granular material in its lower side. A tubular receiving port 5 for receiving the granular material is formed in an upper side of the receiving container 3. Diameters of the openings are set to be approximately equal between the discharge port 4 and the receiving port 5.

The split valve 100 causes the discharge port 4 of the container 2 and the receiving port 5 of the receiving container 3 to communicate with each other in order to transfer the granular material contained in the container 2 to the receiving container 3. The split valve 100 is divided into a passive valve 10 capable of closing the discharge port 4 of the container 2 and an active valve 30 capable of closing the receiving port 5 of the receiving container 3.

In order to transfer a granular material contained in the container 2 into the receiving container 3, the container 2 is conveyed to position over the receiving container 3 using a conveyor or the like while the discharge port 4 of the container 2 is closed by the passive valve 10, and the receiving port 5 of the receiving container 3 is closed by the active valve 30. In addition, the discharge port 4 and the receiving port 5 communicate with each other by connecting the discharge port 4 of the container 2 to the receiving port 5 of the receiving container 3 and performing a valve open operation while the split valve 100 is integrated. As a result, a granular material in the container 2 freely falls down to the inside of the receiving container 3.

It is noted that the receiving port 5 is connected to the receiving container 3 through a telescopic bellows 6. As a result, it is possible to smoothly connect the discharge port 4 to the receiving port 5.

Hereinafter, the split valve 100 will be described in more detail with reference to FIGS. 1 to 3.

First, a description will be made for the passive valve 10.

As illustrated in FIG. 1, the passive valve 10 includes a passive valve seat 11 that is integratedly connected to the lower side of the container 2 and has an inner circumferential surface that defines the discharge port 4, a passive valve body 12 that seats on the passive valve seat 11 to close the discharge port 4, and a support member 13 that supports the lower surface of the passive valve body 12.

The passive valve seat 11 is a ring-like member formed in a spherical shape such that an annular seat surface 11a formed in its inner circumference is narrowed upwardly.

The passive valve body 12 constitutes a upper portion of a upwardly protruding hemisphere. A spherical surface 12a abuts on the spherical seat surface 11a of the passive valve seat 11. The lower surface of the passive valve body 12 is planar, and an upwardly concave hollow 12b is formed in its center.

Figure 2A:
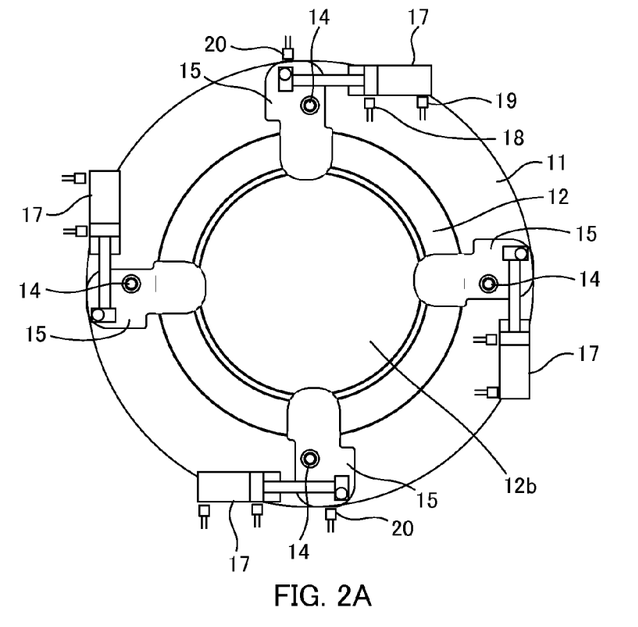
FIG. 2A is a plan view illustrating the split valve of FIG. 1 as seen in an arrow direction A.
Figure 2B:
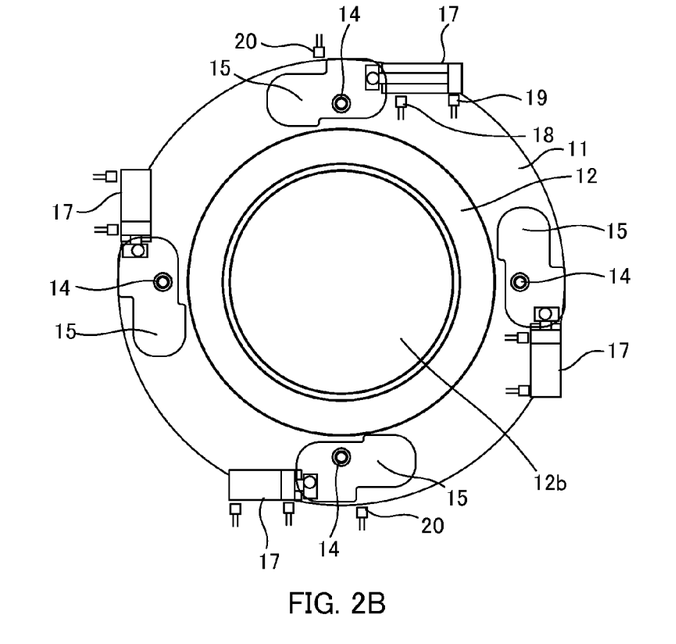
FIG. 2B is a plan view illustrating the split valve of FIG. 1 as seen in an arrow direction A.
Figure 3:
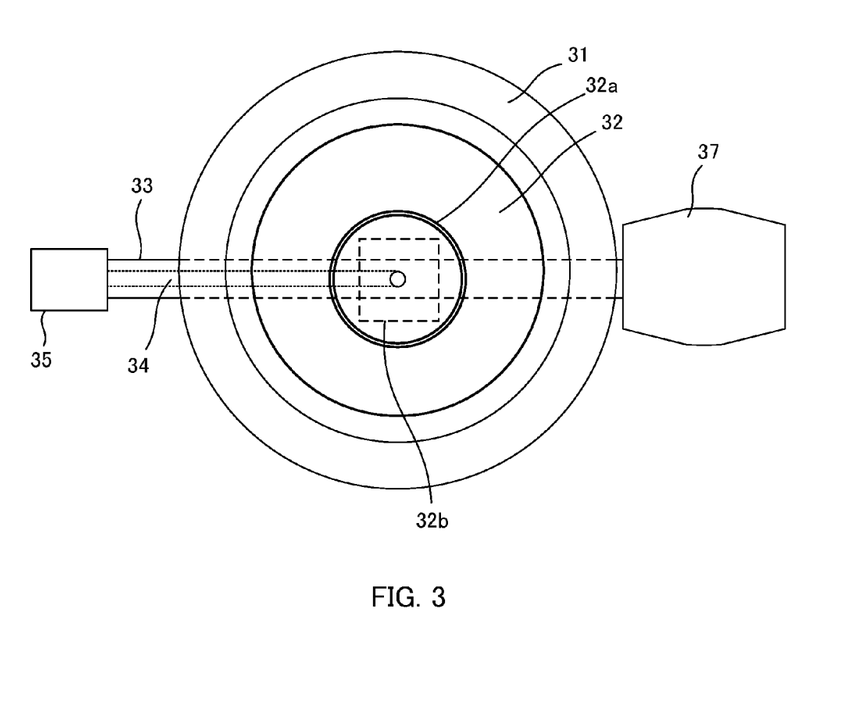
FIG. 3 is a plan view illustrating the split valve of FIG. 1 as seen in an arrow direction B.

The support member 13 includes: a clamp shaft 14 penetrating through the passive valve seat 11 in an axial direction; a clamp 15 that is pivotally supported by the clamp shaft 14 and makes sliding contact with the lower surface of the passive valve body 12; a biasing member 16 that downwardly presses the clamp 15 in the side opposite to the passive valve body 12 with respect to the clamp shaft 14; and an air cylinder 17 that rotates the clamp 15 around the clamp shaft 14 (FIGS. 2A and 2B). The biasing member 16 may include, for example, a disk spring, a plate spring, or other types of springs.

FIGS. 2A and 2B are plan views illustrating the passive valve 10 of FIG. 1 as seen in an arrow direction A. FIG. 2A shows a state that the support member 13 is locked, and FIG. 2B shows a state that the support member 13 is unlocked.

Four clamps 15 are arranged with an equal distance along a circumferential direction of the passive valve seat 11, and each of the clamps 15 is rotated by, approximately, 90° around the clamp shaft 14 by virtue of a driving force of the air cylinder 17.

When the support member 13 is locked as illustrated in FIG. 2A, the clamp 15 abuts on the lower surface of the passive valve body 12. Since the clamp 15 is pressed downwardly by the biasing member 16, the clamp 15 positioned in the passive valve body 12 side with respect to the clamp shaft 14 upwardly presses the passive valve body 12. As a result, the passive valve body 12 is supported by the clamp 15.

When the support member 13 is unlocked as illustrated in FIG. 2B, the clamp 15 does not abut on the lower surface of the passive valve body 12. As a result, it is possible to prevent the clamp 15 from interfering with the passive valve body 12 when the valve is opened.

As illustrated in FIGS. 2A and 2B, a sensor for detecting an expansion/contraction state is provided in each of two positions of the air cylinder 17 separated in the axial direction. Each sensor includes a lock sensor 18 that detects whether or not the clamp 15 is locked, and an unlock sensor 19 that detects whether or not the clamp 15 is unlocked. In addition to the lock sensor 18 and the unlock sensor 19, a lock detection sensor 20 is provided in order to more reliably detect the locking state of the clamp 15. The lock detection sensor 20 is located in a position where the clamp 15 comes close to the lock detection sensor 20 only when the clamp 15 is locked.

Next, a description will be made for the active valve 30.

As illustrated in FIG. 1, the active valve 30 includes: an active valve seat 31 that is provided over the receiving container 3 and has an inner circumferential surface that defines the receiving port 5; an active valve body 32 that seats on the active valve seat 31 to block the receiving port 5 and has a protrusion 32a on its top surface; a shaft 33 connected to a fixing portion 32b formed in the lower side of the active valve body 32 and rotated integratedly with the active valve body 32; an air supply/discharge mechanism 35 that is connected to one end of the shaft 33 and supplies/discharges an air pressure through a communication hole 34 from one end of the shaft 33 to the upper end of the protrusion 32a; and a hydraulic cylinder 36 connected to the lower side of the active valve seat 31 to lift or lower the active valve seat 31.

The active valve seat 31 has a cylindrical shape, and its inner circumference is formed in a spherical shape such that an annular seat surface 31a formed in the upper side of the inner circumference has a diameter narrowed upwardly.

The active valve body 32 constitutes a lower portion of the upwardly protruding hemisphere. A spherical surface 32c abuts on the spherical seat surface 31a of the active valve seat 31. The top surface of the active valve body 32 is planar and has the protrusion 32a fitted to the hollow 12b of the passive valve seat 11.

The shaft 33 extends perpendicularly to the axis of the active valve seat 31 and is pivotally supported by the active valve seat 31. An actuator 37 for driving the shaft 33 is connected to one end of the shaft 33. The shaft 33 is rotated by the actuator 37 by, approximately, 90° so that the active valve body 32 is rotated from a close state to an open state accordingly.

The actuator 37 internally has an air cylinder 38 capable of rotating the shaft 33 as it expands or contracts. In the air cylinder 38, a sensor for detecting an expansion/contraction state is provided in each of two positions separated along the axial direction. Each sensor includes a valve close sensor 39 that detects a state that the active valve body 32 is closed and a valve open sensor 40 that detects a state that the active valve body 32 is opened.

The air supply/discharge mechanism 35 supplies or discharges an air pressure to/from a chamber 41 (FIG. 4B) defined by the protrusion 32a of the active valve body 32 and the hollow 12b of the passive valve body 12.

The hydraulic cylinder 36 is installed in a unit base 7 provided over the receiving container 3 to lift or lower the active valve seat 31 in response to the expansion/contraction. It is noted that the unit base 7 may be connected to the receiving container 3 or other frames.

The active valve seat 31 includes: a correct position sensor 42 that detects whether or not the active valve seat 31 is in a correct position; a lock/unlock position sensor 43 that detects whether or not a gap between the upper surface of the active valve body 32 and the lower surface of the passive valve body 12 reaches a predetermined value; and an hermetic engagement sensor 44 that detects whether or not the upper surface of the active valve body 32 and the lower surface of the passive valve body 12 are perfectly hermetically engaged with each other.

The active valve seat 31 is in the correct position when the hydraulic cylinder 36 contracts at maximum, and the active valve seat 31 is lowered to the lowest position.

The gap between the upper surface of the active valve body 32 and the lower surface of the passive valve body 12 reaches the predetermined value when the hydraulic cylinder 36 expands to lift the active valve seat 31, and the protrusion 32a is fitted to the middle of the hollow 12b of the passive valve body 12. The predetermined value is set to be slightly greater than the thickness of the clamp 15.

The upper surface of the active valve body 32 and the lower surface of the passive valve body 12 are perfectly hermetically engaged with each other when the hydraulic cylinder 36 further expands from a state that the gap between the upper surface of the active valve body 32 and the lower surface of the passive valve body 12 is the predetermined value.

The passive valve 10 and the active valve 30 are configured in this manner and are shaped in the upwardly protruding hemisphere when the passive valve body 12 and the active valve body 32 are hermetically engaged with each other to form an integrated body. It is noted that the rotation axis of the shaft 33 is horizontally decentered from the center of the hemisphere. This will be described in more detail below.

Next, a description will be made for the operation of the split valve 100 with reference to FIGS. 4A to 4H, 5A, and 5B.

FIGS. 4A to 4H are cross-sectional views illustrating a process of opening or closing the split valve 100 in order to transfer a granular material contained in the container 2 into the inside of the receiving container 3. FIG. 5A is a cross-sectional view illustrating the split valve 100 of FIG. 4D as seen in an arrow direction C. FIG. 5B is a cross-sectional view illustrating the split valve 100 of FIG. 4E as seen in the arrow direction C. It is noted that the container 2 and the receiving container 3 are not illustrated in FIGS. 4A to 4H, 5A, and 5B intentionally for simplicity purposes.

First, the operation of opening the split valve 100 will be described.

Figure 4A:
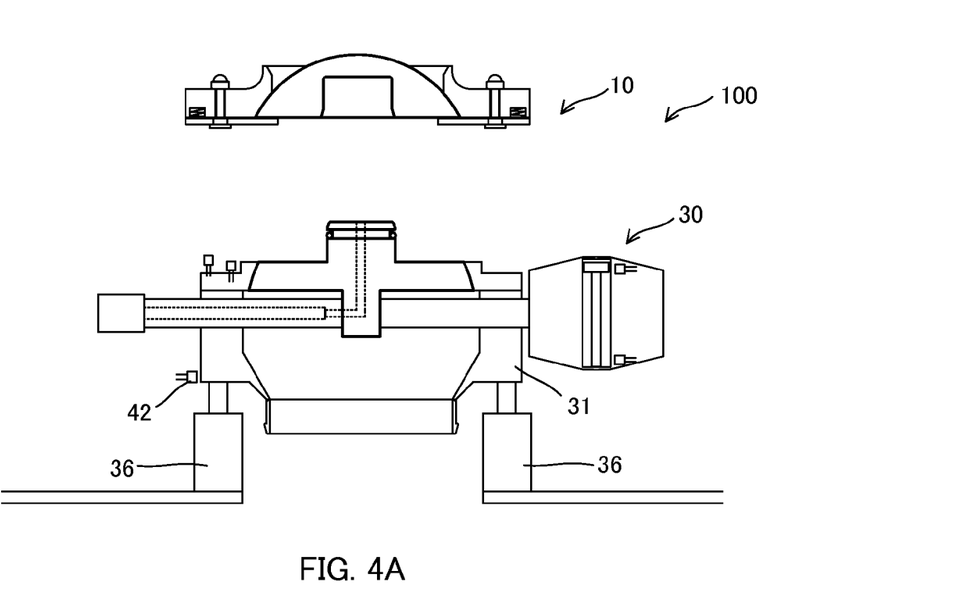
FIG. 4A is a cross-sectional view for explaining the operation of the split valve.
Figure 5A:
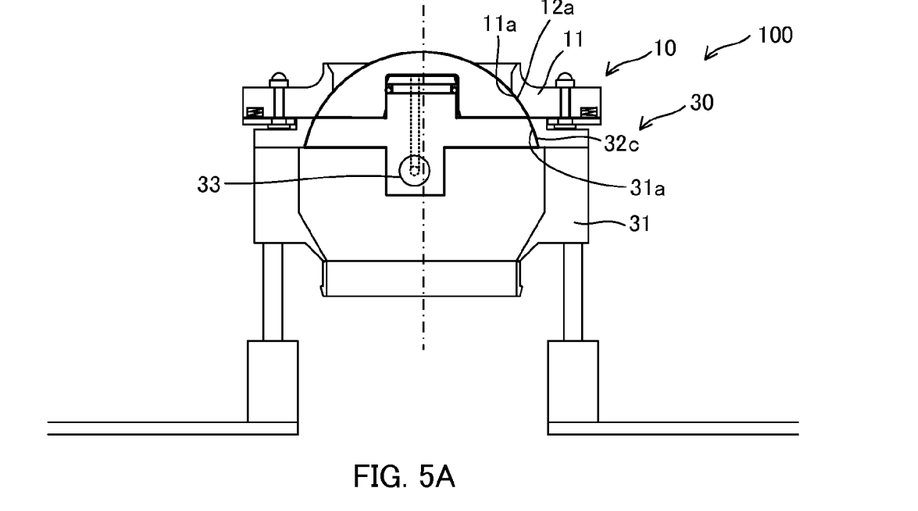
FIG. 5A is a cross-sectional view illustrating the split valve of FIG. 4D as seen in an arrow direction C.
Figure 5B:
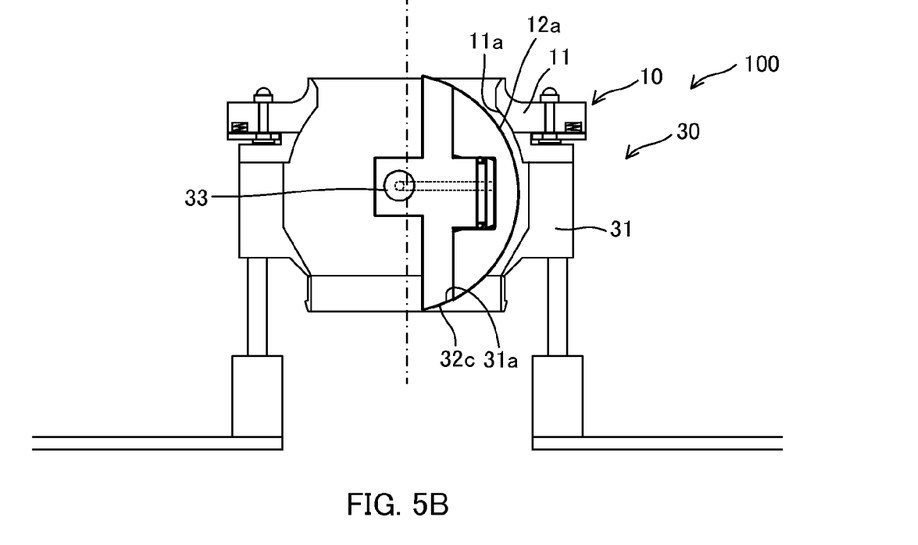
FIG. 5B is a cross-sectional view illustrating the split valve of FIG. 4E as seen in an arrow direction C.

As illustrated in FIG. 4A, the hydraulic cylinder 36 expands to lift the active valve seat 31 while the passive and active valves 10 and 30 are positioned. As a result, since the active valve seat 31 is lifted from the correct position, the detection value of the correct position sensor 42 becomes "OFF."

Figure 4B:
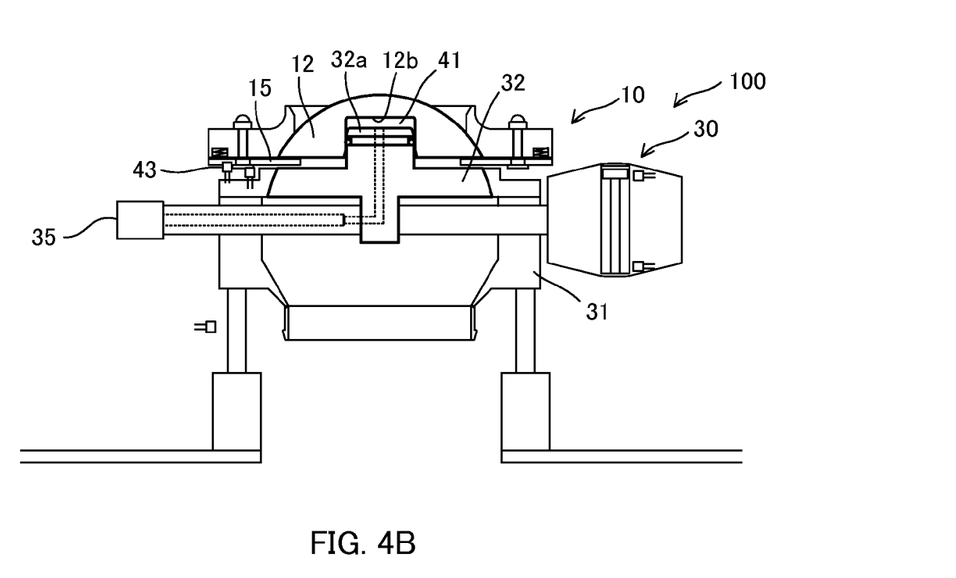
FIG. 4B is a cross-sectional view for explaining the operation of the split valve.

As illustrated in FIG. 4B, the active valve seat 31 is lifted, the protrusion 32a of the active valve body 32 is fitted to the hollow 12b of the passive valve body 12, the gap between the upper surface of the active valve body 32 and the lower surface of the passive valve body 12 reaches the predetermined value, and the detection value of the lock/unlock position sensor 43 becomes "ON." As a result, the lifting of the active valve seat 31 stops.

Then, the air pressure is supplied to the chamber 41 using the air supply/discharge mechanism 35 to upwardly press the passive valve body 12. In this state, all of the clamps 15 are rotated from the lock state to the unlock state. As a result, the detection values of the overall lock sensors 18 become "OFF," the detection value of the lock detection sensor 20 becomes "OFF," and the detection value of the unlock sensor 19 becomes "ON" (FIG. 2B).

Figure 4C:
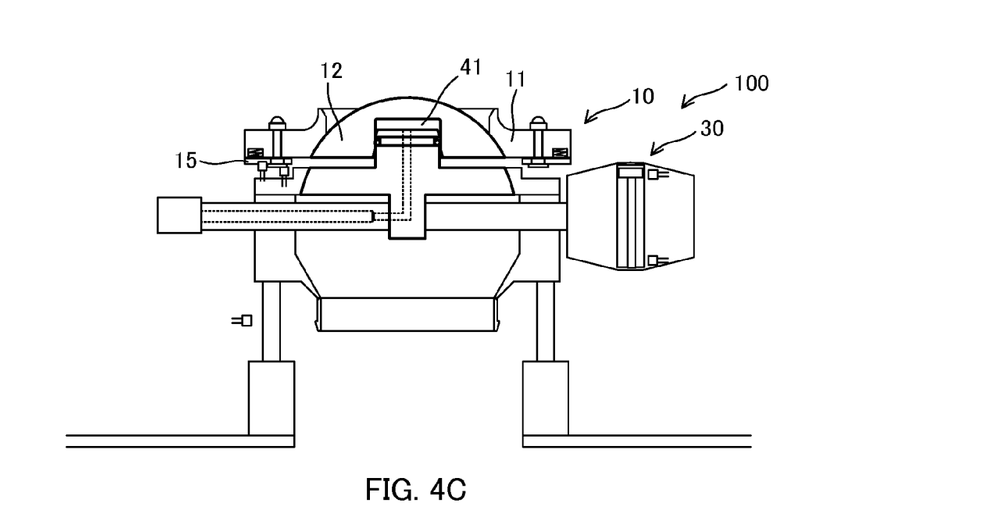
FIG. 4C is a cross-sectional view for explaining the operation of the split valve.

It is noted that the passive valve body 12 is not supported by the clamp 15. However, since the passive valve body 12 is pressed upwardly by the air pressure of the chamber 41 as illustrated in FIG. 4C, the hermetic engagement between the passive valve body 12 and the passive valve seat 11 is maintained.

Figure 4D:
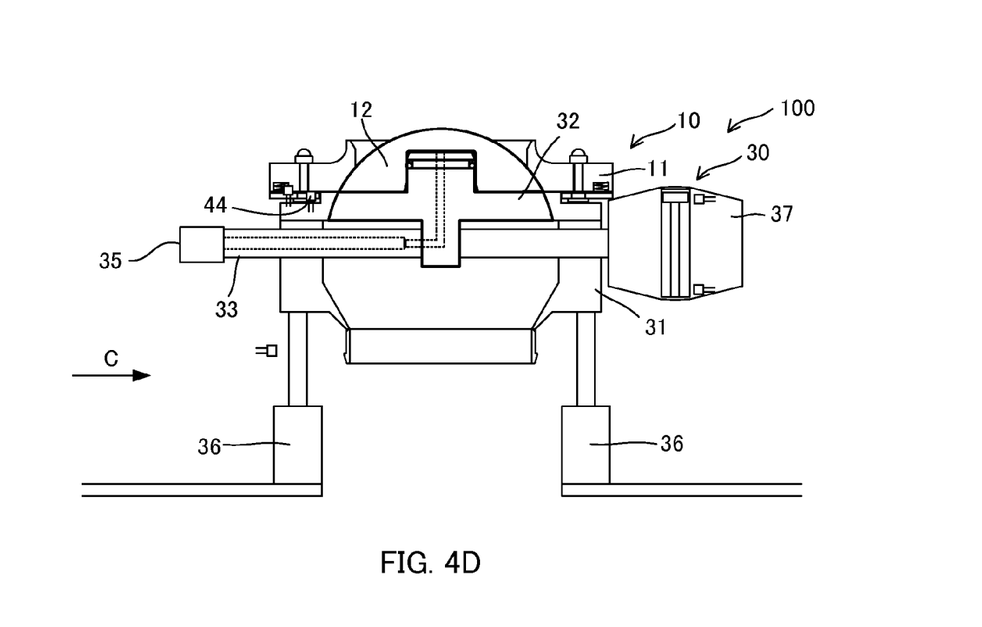
FIG. 4D is a cross-sectional view for explaining the operation of the split valve.

As the hydraulic cylinder 36 further expands to lift the active valve seat 31 as illustrated in FIG. 4D, the upper surface of the active valve body 32 and the lower surface of the passive valve body 12 abut on each other. As a result, the detection value of the hermetic engagement sensor 44 becomes "ON," and therefore, the lifting of the active valve seat 31 stops. Hence, the active valve seat 31 and the passive valve seat 11 are integrated.

Figure 4E:
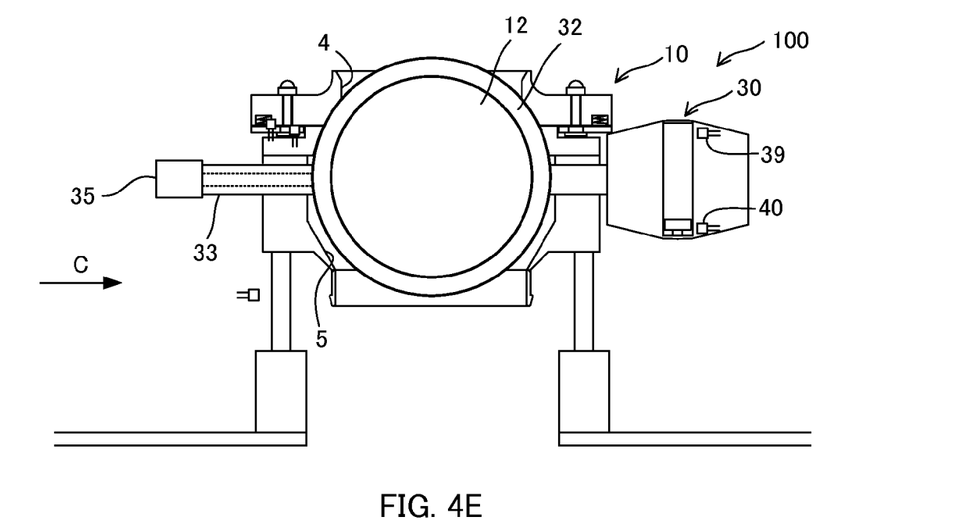
FIG. 4E is a cross-sectional view for explaining the operation of the split valve.

Then, the air pressure inside the chamber 41 is discharged using the air supply/discharge mechanism 35 to vacuumize the chamber 41. As a result, the active valve body 32 and the passive valve body 12 are perfectly hermetically engaged with each other to form an integrated body. When the air pressure inside the chamber 41 decreases to a predetermined pressure close to vacuum, the shaft 33 is rotated using the actuator 37 to rotate the active valve body 32 and the passive valve body 12 by, approximately, 90° around the rotation axis of the shaft 33 as illustrated in FIG. 4E.

As a result, the detection value of the valve close sensor 39 becomes "OFF," the detection value of the valve open sensor 40 becomes "ON," and the discharge port 4 and the receiving port 5 communicate with each other. Therefore, the granular material inside the container 2 freely falls down to the receiving container 3 through the discharge port 4 and the receiving port 5. In this case, since the active valve body 32 and the passive valve body 12 are perfectly hermetically engaged with each other, it is possible to prevent a granular material from intruding into a gap between the active valve body 32 and the passive valve body 12.

Here, a description will be made for a relationship between a center of the hemisphere formed by the active and passive valves 30 and 10 and the rotation axis of the shaft 33 with reference to FIGS. 5A and 5B.

The center of the hemisphere is positioned along the one-dotted chain line in FIGS. 5A and 5B. However, the rotation axis of the shaft 33 is deviated to the left from the one-dotted chain line in FIGS. 5A and 5B. That is, the rotation center is decentered.

As a result, the spherical surfaces 12a and 32c of the hemisphere abutting on the spherical seat surfaces 11a and 31a of the passive and active valve seats 11 and 31 in a closed state are separated from the seat surfaces 11a and 31a as they are rotated around the rotation axis of the shaft 33 (FIGS. 5A and 5B).

Therefore, the valve opening operation of the active valve body 32 and the passive valve body 12 can be smoothly performed. In addition, since the active valve body 32 and the passive valve body 12 abut on the seat surfaces 11a and 31a tightly in the closed state, it is possible to reliably obtain a hermetic sealing property.

Returning to FIG. 4E, the operation of closing the split valve 100 will be described.

The active valve body 32 and the passive valve body 12 are reversely rotated by, approximately, 90° around the rotation axis of the shaft 33 by reversely rotating the shaft 33 using the actuator 37. As a result, the detection value of the valve open sensor 40 becomes "OFF," and the detection value of the valve close sensor 39 becomes "ON," and therefore, the discharge port 4 and the receiving port 5 are blocked.

Figure 4F:
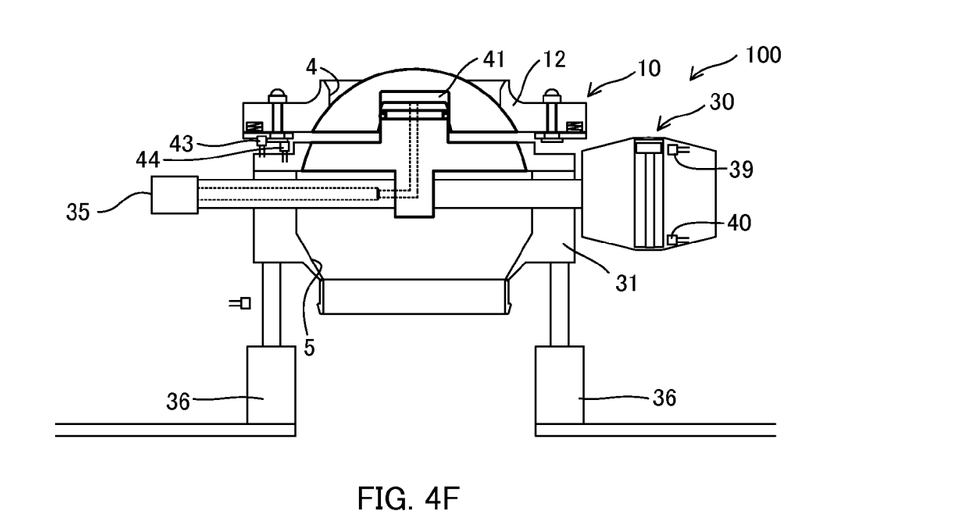
FIG. 4F is a cross-sectional view for explaining the operation of the split valve.

The passive valve body 12 is pressed upwardly by stopping vacuumization of the chamber 41 using the air supply/discharge mechanism 35 and supplying an air pressure to the chamber 41. In this state, when the detection value of the hermetic engagement sensor 44 becomes "OFF," and the detection value of the lock/unlock position sensor 43 becomes "OFF" by contracting the hydraulic cylinder 36 and lowering the active valve seat 31 as illustrated in FIG. 4F, the active valve seat 31 stops.

Figure 4G:
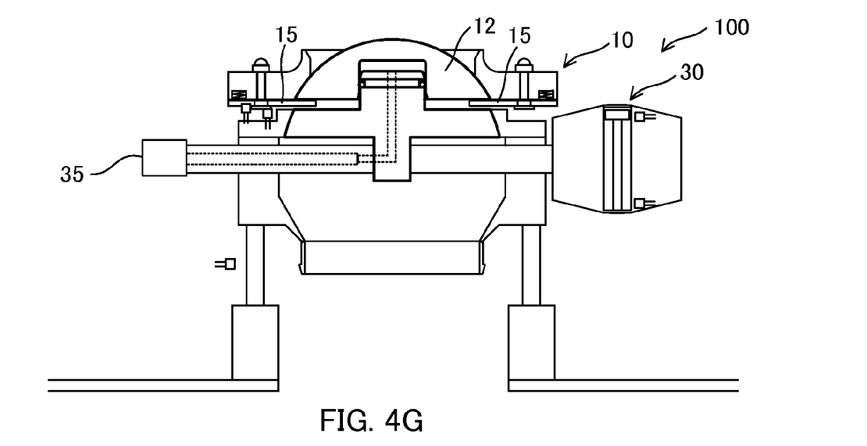
FIG. 4G is a cross-sectional view for explaining the operation of the split valve.
Figure 4H:
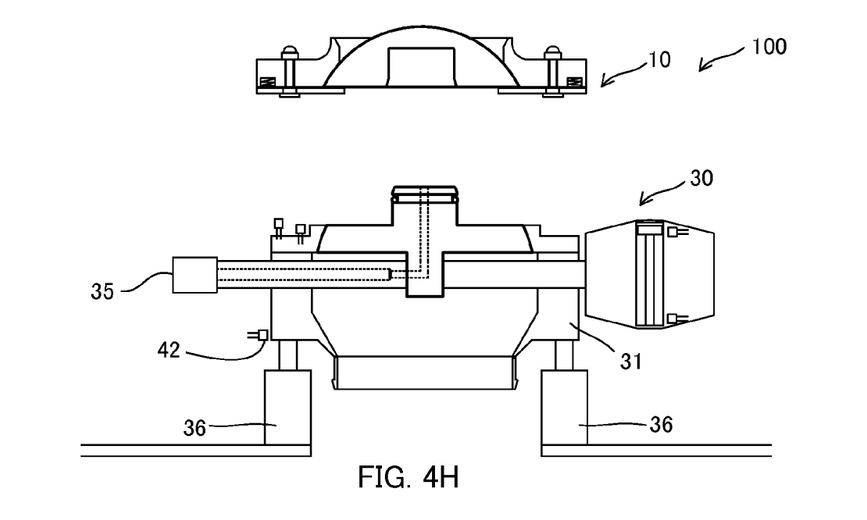
FIG. 4H is a cross-sectional view for explaining the operation of the split valve.

Subsequently, all of the clamps 15 are rotated from the unlock state to the lock state as illustrated in FIG. 4G. As a result, the detection values of the overall unlock sensors 19 become "OFF," and the detection value of the lock sensor 18 becomes "ON," so that the detection value of the lock detection sensor 20 becomes "ON" (FIG. 2A). As a result, the passive valve body 12 is downwardly supported by the clamps 15.

when the detection value of the correct position sensor 42 becomes "ON" by further contracting the hydraulic cylinder 36 and lowering the active valve seat 31 as illustrated in FIG. 4H, the lowering of the active valve seat 31 stops. As a result, the split valve 100 has a perfectly separated state.

According to the embodiments described above, it is possible to obtain the following effects.

Since the discharge port 4 and the receiving port 5 communicate with each other by rotating the active valve body 32 and the passive valve body 12 after the active valve body 32 and the passive valve body 12 are hermetically engaged with each other by vacuumizing the chamber 41 therebetween, it is possible to prevent a granular material from intruding into a gap between the active valve body 32 and the passive valve body 12 when the split valve 100 is opened. Therefore, it is possible to prevent a granular material from scattering to the outside when the active valve body 32 and the passive valve body 12 are separated.

In addition, since the support member 13 that supports the lower surface of the passive valve body 12 is provided, it is possible to prevent the passive valve body 12 from being deviated from the passive valve seat 11 when the split valve 100 is separated.

In addition, the hydraulic cylinder 36 for lifting the active valve seat 31 is provided, and the passive valve body 12 is pressed upwardly by supplying an air pressure to the chamber 41 using the supply/discharge mechanism 35 while the protrusion 32a of the active valve body 32 is fitted to the middle of the hollow 12b of the passive valve body 12. Therefore, it is possible to unlock the support member 13 while the gap between the upper surface of the active valve body 32 and the lower surface of the passive valve body 12 is maintained. Furthermore, it is possible to prevent a granular material from leaking to the outside due to a deviation of the passive valve body 12 from the passive valve seat 11 when the support member 13 is unlocked.

In addition, since the support member 13 has the biasing member 16 that downwardly presses the clamp 15 in the side opposite to the passive valve body 12 with respect to the clamp shaft 14, it is possible to upwardly press the side of the clamp 15 abutting on the passive valve body 12. Therefore, it is possible to reliably prevent the passive valve body 12 and the passive valve seat 11 from being separated when the passive valve body 12 is supported by the support member 13.

In addition, the rotation axis of the shaft 33 is horizontally decentered from the center of the hemisphere formed by integrating the active valve body 32 and the passive valve body 12, and the spherical surfaces 12a and 32c of the hemisphere abutting on the spherical seat surfaces 11a and 31a of the passive valve seat 11 and the active valve seat 31 in a closed state are set to be separated from the seat surfaces 11a and 31a as they are rotated around the rotation axis of the shaft 33. As a result, it is possible to smoothly perform the opening operation of the active valve body 32 and the passive valve body 12. In addition, since the active valve body 32 and the passive valve body 12 abut on the seat surfaces 11a and 31a tightly in a closed state, it is possible to hermetically seal a gap between the container 2 and the receiving container 3.

The embodiments of the present invention described above are merely illustration of some application examples of the present invention and not of the nature to limit the technical scope of the present invention to the specific constructions of the above embodiments.

For example, although the clamp 15 is driven using the air cylinder 17 in the embodiment described above, any other driving mechanism may also be employed.

Alternatively, although the actuator 37 rotationally drives the shaft 33 in response to the expansion/contraction operation of the air cylinder 38, any other driving mechanism may also be employed.

Alternatively, the hydraulic cylinder 36 for lifting the active valve seat 31 may be substituted with any other driving mechanism such as an air cylinder.

The present application claims a priority based on Japanese Patent Application No. 2013-171419 filed with the Japan Patent Office on Aug. 21, 2013, all the contents of which are hereby incorporated by reference.

What is claimed is:

1. A split valve that causes a discharge port provided in a lower side of a container and a receiving port provided in an upper side of a receiving container to communicate with each other in order to transfer a granular material contained in the container to the receiving container, comprising:
   an upper valve body that constitutes an upper portion of a upwardly protruding hemisphere and has a spherical surface abutting on a spherical seat surface of the discharge port to block the discharge port and has a hollow on a lower surface;
   a lower valve body that constitutes a lower portion of the hemisphere and has a spherical surface abutting on a spherical seat surface of the receiving port to block the receiving port and has a protrusion fitted to the hollow of the upper valve body on an upper surface;
   a shaft that is connected to the lower valve body and can rotate the lower valve body;
   an air supply/discharge mechanism that is configured to supply/discharge an air pressure to/from a chamber defined by the protrusion and the hollow, wherein the lower valve body and the upper valve body are hermetically engaged with each other by causing the upper surface of the lower valve body and the lower surface of the upper valve body to abut on each other and vacuumizing the chamber, and the discharge port and the receiving port then communicate with each other by rotating the shaft,
   a support member that is switchable between a lock state in which the lower surface of the upper valve body is supported and an unlock state in which the lower surface of the upper valve body is not supported; and
   a lift mechanism that is configured to lift or lower the lower valve body in the receiving port, wherein:
   the upper valve body is upwardly pressed by supplying an air pressure to the chamber while the protrusion is fitted to a middle of the hollow by lifting the receiving port;
   the upper surface of the lower valve body and the lower surface of the upper valve body abut on each other by further lifting the receiving port while the support member switches to the unlock state; and
   the discharge port and the receiving port communicate with each other by rotating the shaft after the lower valve body and the upper valve body are hermetically engaged with each other by vacuumizing the chamber.

2. The split valve according to claim 1, wherein the support member includes a clamp that makes sliding contact with the lower surface of the upper valve body and is pivotally supported by a clamp shaft and moves between the lock state and the unlock state, a biasing member that downwardly presses the clamp in a side opposite to the upper valve body with respect to the clamp shaft, and a rotation mechanism that is configured to rotate the clamp around the clamp shaft.

3. The split valve according to any one of claim 1, wherein:
a rotation axis of the shaft is horizontally decentered from a center of the hemisphere; and
the seat surface and the spherical surface are separated from each other as the shaft is rotated from a closed-valve state in which the seat surface and the spherical surface match each other.

\* \* \* \* \*